P. H. VANDER WEYDE.
PREVENTING INCRUSTATION IN STEAM BOILERS.
No. 62,093.                    Patented Feb. 12, 1867.
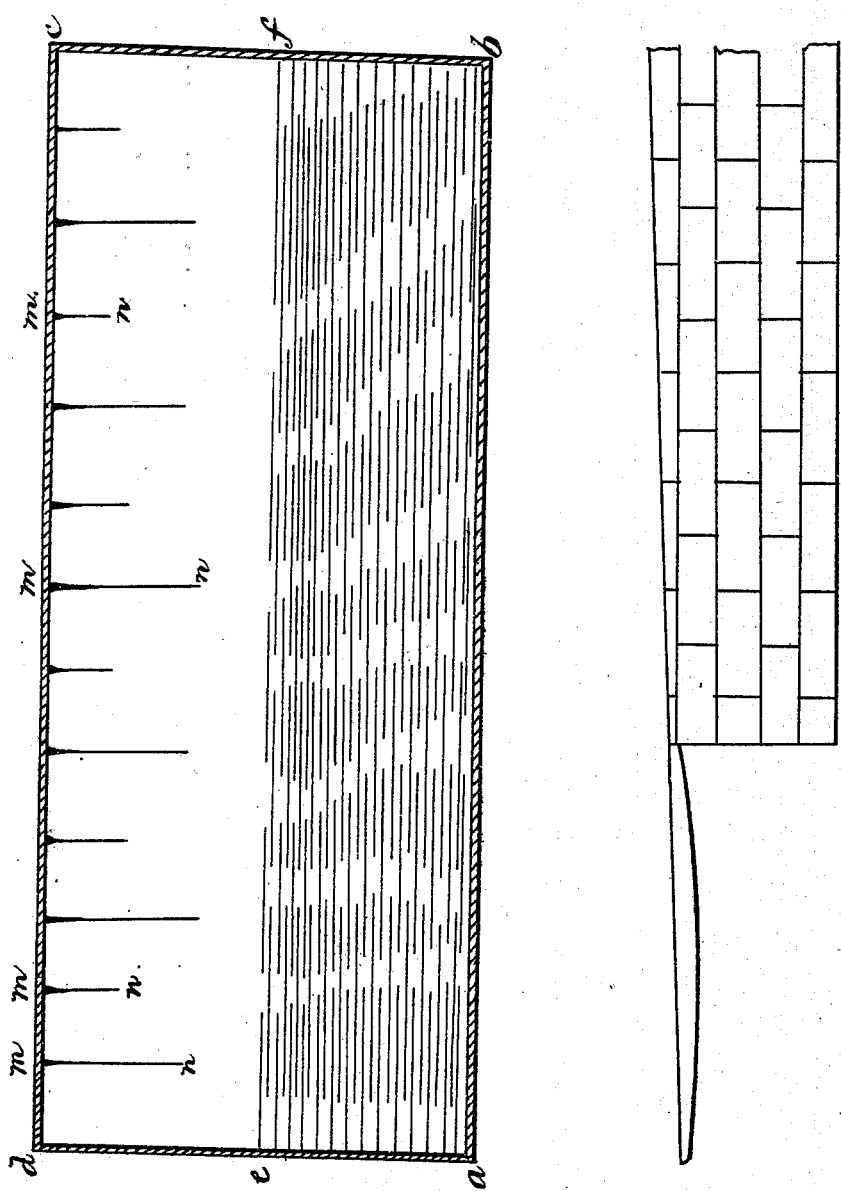
Witnesses:
Louis De Roneroy
J. W. Lafferre
Inventor
P. H. Vander Weyde M.D.

United States Patent Office.

P. H. VANDER WEYDE, OF PHILADELPHIA, PENNSYLVANIA.

Letters Patent No. 62,093, dated February 12, 1867.

---

IMPROVEMENT IN PREVENTING INCRUSTATION IN STEAM BOILERS.

---

The Schedule referred to in these Letters Patent and making part of the same.

---

Be it known that I, P. H. VANDER WEYDE, of the city and county of Philadelphia, State of Pennsylvania, have discovered the cause whereby steam boilers may be protected from incrustation by electric conduction, and that I consequently have been able to simplify the mysterious arrangement lately patented, and intended to accomplish this purpose, depriving this arrangement of all unnecessary additions, and reducing it to a few simple inverted lightning-rods My discovery is, that the solid particles of the salts of lime, baryta, magnesia, soda, potash, &c., when previously dissolved in water, and rapidly deposited from their solution by heat, will be positive (+) electric, and the water negative (—) electric. If, therefore, we are able to communicate to the bottom of a steam boiler an equal small amount of positive (+) electricity, it will repel any positively charged deposit, as two bodies charged with similar electricity will repel one another. Fortunately we may obtain this positive (+) electricity from the steam above the water in the boiler, as it is well known that vapor of water containing any solution of salt will also be positive (+) electric; all we have to do, therefore, is to place in this steam or vapor a number of small inverted lightning-rods, attached to the top of the boiler, and projecting for several inches downward in the steam room.

The following is a description of this so very simple arrangement which will enable others to make and use the invention.

$a\ b\ c\ d$ is the steam boiler, $a\ b\ f\ e$ the water, and $f\ e\ d\ c$ the steam room. In the latter are a number of rods $mn\ mn$ attached to the top; they are of different lengths, and pointed at their lower extremity; they will collect the positive (+) electricity of the steam and conduct it to the whole surface of the boiler, which positive electric charge will at its bottom be discharged in the water, repel there the positive electric deposit, preventing it from settling, and keep it suspended in the water, so that it occasionally may be removed by being blown off. That the salts deposited from a solution are positive electric, has been also verified by Pouillet (see *Annales de Chimie et de Physique*, second series, tome xxxvi, page 5,) and that the vapor or steam is charged with the same electricity, is also found by Peltier, (see the same work, third series, tome iv, page 144,) and farther in *Daguin Physique*, tome ii, page 555.

I disclaim any conductor, suspended or not by isolated attachments, this being evidently unnecessary. I disclaim a conductor armed at one end with steel points, magnetized or not magnetized, this being not only useless, but absurd; but what I claim, and wish to secure by Letters Patent, is—

Claim.

The attachment, within the upper part of the steam room of a boiler, of a number of short rods, resembling small inverted straight or curved lightning-rods, or their equivalents, intended to carry the positive electricity of the steam to the bottom of the boiler, where it, discharging in the water, repels the electro-positive deposits, preventing them from settling, and thus protects the boiler from incrustation.

In testimony whereof I have signed my name to this specification in the presence of two subscribing witnesses.

P. H. VANDER WEYDE.

Witnesses:
 LOUIS D. RONCERAY,
 J. W. LASSERRE.